United States Patent [19]

Watanabe et al.

[11] Patent Number: 4,598,001

[45] Date of Patent: Jul. 1, 1986

[54] BUMPER CORE AND PROCESS PRODUCING SAME

[75] Inventors: Noboru Watanabe, Imaichi; Hisao Tokoro, Kamikawachi; Syuichi Ohhara, Utsunomiya, all of Japan

[73] Assignee: Japan Styrene Paper Corporation, Tokyo, Japan

[21] Appl. No.: 591,542

[22] Filed: Mar. 20, 1984

[30] Foreign Application Priority Data

Mar. 24, 1983 [JP] Japan .................................. 58-49479

[51] Int. Cl.⁴ ............................................ B60R 13/04
[52] U.S. Cl. ..................................... 428/31; 156/242; 293/109; 293/120; 428/71
[58] Field of Search ............... 428/542.8, 31, 71; 293/110, 120, 109; 156/242; 521/56, 58, 60

[56] References Cited

U.S. PATENT DOCUMENTS

| | | | |
|---|---|---|---|
| 3,546,038 | 12/1970 | Smith | 156/242 X |
| 3,616,172 | 10/1971 | Rubens | 428/71 |
| 3,787,083 | 1/1974 | Perlberg | 293/109 |
| 3,856,613 | 12/1974 | Weller | 293/120 X |
| 3,876,082 | 4/1975 | Fehl et al. | 293/109 X |
| 4,010,297 | 3/1977 | Wenrick | 428/31 |
| 4,150,077 | 4/1979 | Slocumb | 264/53 |
| 4,175,998 | 11/1979 | Hay et al. | 156/71 X |
| 4,211,822 | 7/1980 | Kurfman et al. | 428/31 X |
| 4,268,552 | 5/1981 | Duvdevani et al. | 428/31 |
| 4,346,205 | 8/1982 | Hiles | 428/71 X |
| 4,358,489 | 11/1982 | Green | 428/40 X |
| 4,399,087 | 8/1983 | Akiyama et al. | 264/53 |
| 4,504,534 | 3/1985 | Adachi et al. | 428/31 X |

*Primary Examiner*—Henry F. Epstein
*Attorney, Agent, or Firm*—Saul Jecies

[57] ABSTRACT

A bumper core suitable for use in the fabrication of an energy-absorbing automobile bumper is formed by molding core-constituting members in accordance with the expansion molding process and then bonding them together at their confronting lengthwise end portions into a unitary body. The core-constituting members are formed into such configurations and dimensions that conform with configurations and dimensions obtained by longitudinally dividing the intended core into at least two parts. The bumper core enjoys extremely-high dimensional accuracy.

10 Claims, 4 Drawing Figures

BUMPER CORE AND PROCESS PRODUCING SAME

BACKGROUND OF THE INVENTION (1) Field of the Invention

This invention relates to a bumper core suitable for use in the fabrication of an automobile bumper and a process producing same.

(2) Description of the Prior Art

Metal-made bumpers have conventionally been used as automobile bumpers. Bumpers made of synthetic resins have been used due to their reduced weight in recent years, since weight reduction of automobiles saves energy. A bumper of the above sort, which is made of a synthetic resin, is generally formed of a foam core and a covering enclosing the core therein and made of a synthetic resin or the like. A foam core may consist of polyurethane foam, polyethylene foam, polystyrene foam or the like.

A foam core is an important part which governs the performance of the resulting bumper and is generally required to have excellent energy absorption capacity and dimensional predetermined recovery. Besides, cores having low densities fulfill the recent demand for lighter automobiles.

Polyurethane foams of the prior art cores for bumpers, are however accompanied by drawbacks such as to obtain the weight reduction due to their high densities (generally 0.09–0.15 g/cm$^3$) and their production costs are high although they have excellent energy absorption capacity and dimensional percent recovery. Polyethylene foams have poor energy absorption capacity and heat resistance. The dimensional percent recovery and impact resistance of polystyrene foam are both poor. Prior art bumper cores have both merits and demerits as mentioned above but are unable to simultaneously satisfy three conditions required for bumper cores, namely, (1) excellent energy absorption capacity, (2) superb dimensional percent recovery and (3) low density for weight reduction.

As an improvement to the above-mentioned bumper cores, the present assignee had already developed as a result of a joint research with another party a bumper core formed of a molded article of foamed beads of a polypropylene-base resin and having a density and compressive stress respectively within specific ranges, described in a U.S. Pat. application Ser. No. 619,693 filed June 13, 1984 (which is a division of abandoned Ser. No. 504,289 filed June 14, 1983) now U.S. Pat. No. 4,504,534 dated Mar. 12, 1985. The above bumper core is an epochal one and satisfies the above-described three conditions for cores but lacks the dimensional accuracy desired.

Namely, the present bumper core is produced by the expansion molding process. After taking a molded article out of a mold, the molded article undergoes shrinkage although the shrinkage is small. This shrinkage however develops an error in the lengthwise dimension of the resultant core, whereby making it difficult to obtain molded articles of substantially identical dimensions. Thus, the above-developed bumper core has still some room for improvements with respect to its dimensional accuracy, because a bumper core is required to have particularly strict dimensional accuracy.

SUMMARY OF THE INVENTION

With the foregoing in view, this invention has as its object the provision of a bumper core satisfying properties required for bumper cores and having good dimensional accuracy as well as its production process.

In one aspect of this invention, there is thus provided a bumper core comprising at least two core-constituting members, each of which is composed of a molded article of foamed beads of a polypropylene-base resin, bonded into a unitary body so that the core-constituting members are connected together at their confronting lengthwise end portions.

In another aspect of this invention, there is also provided a process for producing a bumper core, which process comprises:

(a) filling pre-foamed beads of a polypropylene-base resin in a mold having internal configurations and dimensions which conform with external configurations and dimensions obtained by longitudinally dividing the core into at least two parts;

(b) heating the pre-foamed beads in the mold to cause the pre-foamed beads to expand there, thereby molding a core-constituting member;

(c) providing at least two core-constituting members in accordance with the steps (a) and (b); and (d) bonding the core-constituting members together at their confronting lengthwise end portions into a unitary body conforming in overall configurations and dimensions with the bumper core.

The process of the present invention permits to adjust the lengthwise dimension of each core suitably upon bonding its core-constituting members together. the lengthwise dimensional error can generally be lowered to 0.2–0.6%. Therefore, the resulting core enjoys extremely-high dimensional accuracy. Furthermore, the core of this invention has excellent energy absorption capacity and dimensional percent recovery while materializing a weight reduction.

The above and other objects, features and advantages of the present invention will become apparent from the following description and the appended claims, taken in conjunction with the accompanying drawings.

DETAILED DESCRIPTION OF THE INVENTION AND PREFERRED EMBODIMENT

Figure 1:
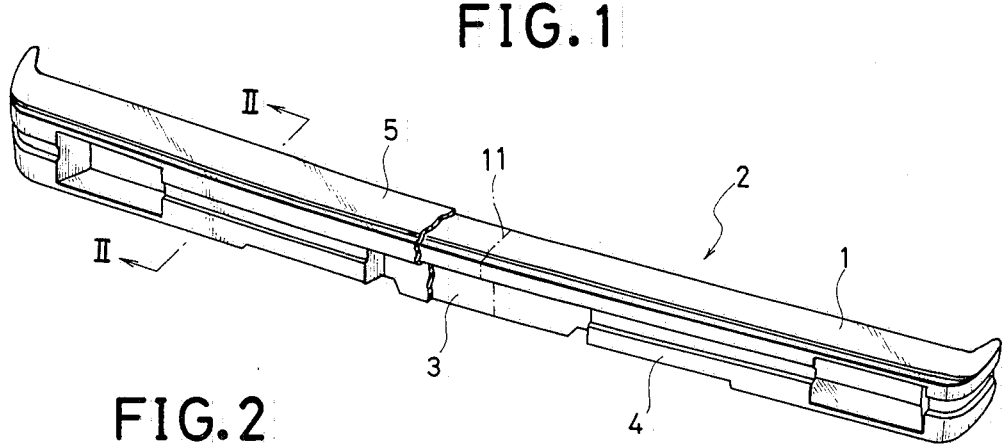
FIG. 1 is a perspective veiw of an automobile bumper making use of a bumper core according to one embodiment of this invention, in which the right half of a covering has been removed to show the bumper core.

The bumper core according to this invention is produced by at least two core-constituting members, which are each formed of a molded article of foamed beads of a polypropylene-base resin, bonded together into a unitary body. As the polypropylene-base resin, may for example be mentioned an ethylene-propylene random copolymer, ethylene-propylene block copolymer, propylene homopolymer, or the like. It may be either a crosslinked resin or a non-crosslinked resin. A non-crosslinked polypropylene-base resin is particularly preferred.

Pre-foamed beads, which are made of a polypropylene-base resin and are useful for the production of cores of this invention, may for example be prepared in the following manner. Namely, beads made of the polypropylene-base resin are dispersed together with a volatile blowing agent in water in a hermetic vessel. The contents are heated to a temperature of the softening point of the beads or higher so that the beads are impregnated with the blowing agent. Thereafter, the vessel is opened at one end thereof to release the beads and water simultaneously from the vessel into the atmosphere of a lower pressure while maintaining the intravessel pressure at a predetermined level, thereby obtaining pre-foamed beads. If necessary, the pre-foamed beads may be aged at room temperature and under normal pressure. The resulting pre-foamed beads may be subjected, if necessary or desired, to further aging under an elevated pressure by means of an inorganic gas or a gaseous mixture consisting of an inorganic gas and a volatile blowing agent so that the intra-bead pressure may be raised.

In the production process of a bumper core which process pertains to the present invention, the above-prepared pre-foamed beads are first of all filled in a mold which is capable of enclosing the pre-foamed beads but allowing escape of gases therefrom. The beads are then heated to cause them to expand. Two or more core-constituting members (i.e., articles molded respectively in the above mold) are obtained by repeating the above procedures. As the above-mentioned mold, may be employed a mold having internal configurations and dimensions which conform with the external configurations and dimensions of each of parts or pieces obtained by longitudinally dividing an intended final bumper core into two or more and defining in its inner wall small holes through which a heating medium such as steam or the like may pass. Needless to say, only one mold, or only one type of molds is required if the final bumper core is symmetric with respect to its central point. Two or more different bypes of molds are however required if the final bumper core is not symmetric with respect to its central point, in other words, the final bumper core is not symmetric with respect to its longitudinal central plane or its lateral central plane or if the final bumper core is to be made of three or more core-constituting members.

Then, the two or more core-constituting members are bonded together into a unitary body. Here, it is preferred to adjust the dimensions of each core-constituting member to prescribed dimensions by subjecting it to cutting-machining or the like prior to the bonding step of the core-constituting members. The bonding of the core-constituting members may be carried out for example by the thermal melt-bonding technique making use of suitable heating means or by the adhering technique relying upon an adhesive. When the bonding is carried out by the thermal melt-bonding technique, it is preferred to make core-constituting members somewhat larger than their predetermined dimensions so that their dimensions may be correctly adjusted to the predetermined dimensions by suitably controlling the extents of their melting upon their melt-bonding.

When carrying out the bonding of core-constituting members with an adhesive, it is possible to adjust their dimensions to their prescribed levels by cutting end portions of the core-constituting members, which end portions are to be bonded together, over desired widths or on the contrary, by inserting an interposing piece or block between the end portions.

As heating means useful in the practice of the thermal melt-bonding technique, it is possible to use for example a heating blade, hot gas or the like.

Since the present invention permits to adjust the lengthwise dimension of the core suitably upon bonding the core-constituting members together, its dimensional error may generally be kept within an error range of 0.2–0.6% and the resulting core enjoys an extremely high level of dimensional accuracy.

The bumper core of this invention has a density of 0.015–0.045 g/cm$^3$ or preferably 0.02–0.035 g/cm$^3$ and a compressive stress of 1 kg/cm$^2$ or higher at 50% compression.

One embodiment of this invention will hereinafter be described with reference to the accompanying drawings.

Figure 2:
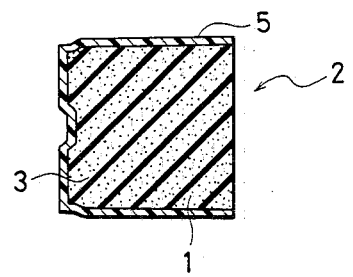
FIG. 2 is a cross-sectional view of the automobile bumper, taken along line II—II of FIG. 1.

FIGS. 1 and 2 illustrate a bumper 2 making use of a bumper core 1 according to one embodiment of this invention. The bumper core 1 is formed of a first core-constituting member 3 and a second core-constituting member 4. A covering 5 made of polyurethane, polypropylene, polyethylene, polycarbonate or the like is applied over the bumper core 1 so as to form the bumper 2. The core 1 and covering 5 may be either bonded into a unitary body for example by adhering or melt-bonding them or kept unbonded.

The two core-constituting members 3,4 are mutually bonded into the unitary body in such a way that their confronting longitudinal end portions are connected together. In FIG. 1, numeral 11 indicates a bonding line.

The two core-constituting members 3,4 have each been formed into configurations and dimensions conforming with those obtained by longitudinally dividing the core 1 into two parts. They are bonded together with the bonding line 11 assuming substantially the lengthwise central part of the core 1.

Figure 3:
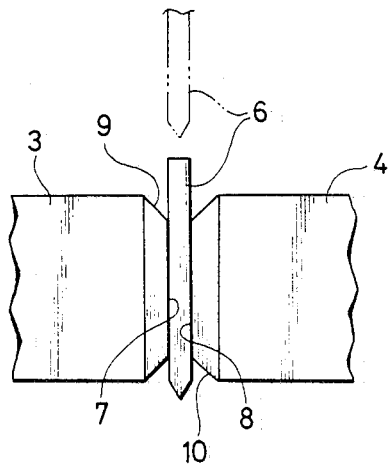
FIG. 3 is a schematic front elevation showing a production process according to one embodiment of this invention.

FIG. 3 illustrates a bonding step making use of a heating blade 6 upon bonding the two core-constituting members 3,4 into the unitary body by the thermal melt-bonding technique.

When conducting the bonding step, the core-constituting members 3,4 are mounted on an unillustrated bonding machine. The bonding machine is equipped for example with two tables, which are displaceable in mutually-approaching and retreating directions. The core-constituting members 3,4 are first of all fixed on their corresponding tables. The tables are then displaced in the mutually-approaching direction and stopped when the end portions 7,8 of the core-constituting members 3,4, which end portions 7,8 are to be bonded together, have been brought closer to each other with a prescribed interval left therebetween. Thereafter, the heating blade 6 advances downwardly and enters the spacing between the end portions 7,8. After heating and melting the end portions 7,8, the heating blade 6 retreats upwardly to a position remote from the end portions 7,8. Immediately after the upward retreat of the heating blade 6, the two tables are displaced further in the mutually-approaching direction so that the molten end portions 7,8 are pressed against each other so as to bond the core-constituting members 3,4 into a unitary body.

When heating and melting the end portions 7,8 in the above manner, the heating blade 6 may be kept either in contact or out of contact with the end portions 7,8.

However, it is preferred to keep the heating blade 6 out of contact with the end portions 7,8 because molten resin chips would not stick on the heating blade 6.

The preferred temperature of the heating blade 6 may range from 150° C. to 400° C.

By controlling the extents of molten parts of the end portions 7,8 the lengthwise dimension of the resulting core can be adjusted as desired.

It may be preferred to form tapered portions 9,10 respectively at the end portions 7,8 as illustrated in FIG. 3. The tapered portions 9,10 permit to keep burr in the recesses formed by the tapered portions 9,10 even if such burr would occur upon melting the end portions 7,8, whereby preventing such burr from protruding onto the surface of the resulting core. This has brought about an advantage that no deburring work is necessary upon applying the covering 5. The tapered portions 9,10 may be formed simultaneously upon molding the core-constituting members 3,4 or after the molding of the core-constituting members 3,4, by machining the end portions 7,8 in accordance with the cutting or like technique.

As mentioned above, the bumper core of this invention may be formed by bonding three or more core-constituting members into a unitary body.

As has been described above, the bumper core of this invention is formed by bonding two or more bumper-constituting members into a unitary body. The bumper core enjoys good lengthwise dimensional accuracy. It is particularly advantageous to bond the core-constituting members together by the thermal melt-bonding technique, since a product having extremely good dimensional accuracy can be obtained with a simple operation, namely, by merely controlling the extent of melting of each end portion to be bonded. The bumper core of this invention can also satisfy conditions required for bumper cores, in other words, it is excellent in energy absorption capacity and dimensional percent recovery and it materializes weight reduction.

Certan specific examples of this invention will be described.

EXAMPLES 1-4 AND COMPARATIVE EXAMPLES 1-2

Placed in a hermetic vessel were 100 parts by weight of beads made of an ethylene-propylene random copolymer, 0.3 part by weight of aluminum oxide particles, 300 parts by weight of water and a volatile blowing agent given in Table 1. The contents were heated to 145° C. with stirring and then kept at the same temperature for 30 minutes. Then, while maintaining the pressure in the vessel at 30 kg/cm$^2$(G) by means of nitrogen gas, one end of the vessel was opened so as to release the resin beads and water at the same time into the atmosphere. Thus, the resin beads were foamed, thereby obtaining pre-foamed beads. The density of the thus-obtained pre-foamed beads is given in Table 1.

Then, the pre-foamed beads were placed in a pressure vessel and subjected to pressurizing treatment in the air, at 2 kg/cm$^2$(G) and for 48 hours. Thereafter, the thus-treated beads were filled in a first and second molds and then heated there with steam of 3.2 kg/cm$^2$(G), thereby subjecting the treated beads to expansion molding. The first and second molds had internal walls corresponding to the configurations and dimensions obtained by dividing the intended final bumper core into two parts. Accordingly, core-constituting members having configurations and dimensions conforming with those obtained by dividing the final bumper core into two parts were obtained respectively from the two molds.

The thus-obtained core-constituting members were mounted on a bonding machine. Their end portions were heated and molten by means of a heating blade of 300° C. and then bonded together, thereby obtaining a bumper core.

In Comparative Example 1, a mold having an inner wall corresponding to the overall configurations and dimensions of the intended bumper core was filled with pre-foamed beads. By the one-step molding technique, a one-piece bumper core was obtained.

The lengthwise dimensional accuracy of each of the above-obtained cores was measured. Besides, each of the above-obtained cores was subjected to an energy absorption efficiency test, dimensional percent recovery test and heat resistance test. Results are summarized in Table 2.

In Comparative Example 2, similar measurement and tests were conducted on a commercial bumper core made of polystyrene foam. Results are also given in Table 2.

TABLE 1

|  | Blowing agent (amount added) | Density of pre-foamed beads (g/cm$^2$) |
| --- | --- | --- |
| Example 1 | Dichloro-difluoromethane (18 pbw) | 0.03 |
| Example 2 | Dichloro-difluoromethane (17 pbw) | 0.04 |
| Example 3 | Dichloro-difluoromethane (16 pbw) | 0.045 |
| Example 4 | Dichloro-difluoromethane (20 pbw) | 0.02 |
| Comparative Example 1 | Dichloro-difluoromethane (18 pbw) | 0.03 |

TABLE 2

|  | Base resin | Density of molding (g/cm$^3$) | Compressive stress at 50% compression (kg/cm$^2$) | Dimensional accuracy[1] | Energy absorption efficiency[2] | Dimensional percent recovery[3] | Heat resistance[4] |
| --- | --- | --- | --- | --- | --- | --- | --- |
| Example |  |  |  |  |  |  |  |
| 1 | Ethylene-propylene random copolymer | 0.03 | 1.6 | ⊙ | ○ | ⊙ | ⊙ |
| 2 | Ethylene-propylene random copolymer | 0.04 | 2.0 | ⊙ | ○ | ⊙ | ⊙ |
| 3 | Ethylene-propylene random copolymer | 0.045 | 2.7 | ⊙ | ○ | ○ | ⊙ |
| 4 | Ethylene-propylene random copolymer | 0.02 | 1.4 | ⊙ | ○ | ⊙ | ⊙ |
| Comp. Ex. |  |  |  |  |  |  |  |
| 1 | Ethylene-propylene | 0.03 | 1.6 | X | ○ | ⊙ | ⊙ |

TABLE 2-continued

| | Base resin | Density of molding (g/cm³) | Compressive stress at 50% compression (kg/cm²) | Dimensional accuracy[1] | Energy absorption efficiency[2] | Dimensional percent recovery[3] | Heat resistance[4] |
|---|---|---|---|---|---|---|---|
| 2 | random copolymer Polystyrene | 0.03 | 2.5 | ○ | ○ | X | X |

In Table 2, the dimensional accuracy (1) indicates a deviation of the dimensions of each resulting product from the target dimensions. The dimensional accuracy was evaluated in accordance with the following system:
 ○—less than 0.3%.
 —0.3% (inclusive) to 04% (exclusive).
 Δ—0.4% (inclusive) to 0.6% (exclusive).
 X—0.6% and more.

Figure 4:
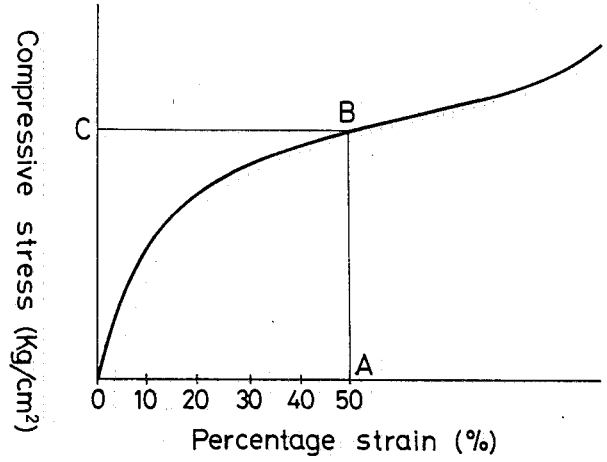
FIG. 4 is a diagram showing a stress-strain curve.

The energy absorption efficiency (2) was calculated in accordance with the following equation:

$$\text{Energy absorption efficiency} = \frac{\text{Area } OAB}{\text{Area } OABC} \times 100$$

based on a stress-strain curve shown in FIG. 4, which curve was obtained by pressing each sample at 20° C. and at a compressive speed of 10 mm/min. The energy absorption efficiency was ranked in accordance with the following system:
 ○—70% and higher.
 Δ—50% (inclusive) to 70% (exclusive).
 X—lower than 50%.

The dimensional percent recovery (3) means a ratio of the dimensions of each sample upon an elapsed time of 30 minutes after pressing same in the energy absorption efficiency test to its dimensions before the press. The dimensional percent recovery was evaluated in accordance with the following system:
 ○—90% and higher.
 —80% (inclusive) to 90% (exclusive).
 Δ—70% (inclusive) to 80% (exclusive).
 X—lower than 70%.

The heat resistance (4) was evaluated in accordance with the following system, based on the percentage volume shrinkage of each sample after heating same at 100° C. for 22 hours.
 ○—less than 10%.
 —10% (inclusive) to 20% (exclusive).
 Δ—20% (inclusive) to 50% (exclusive).
 X—higher than 50%.

Having now fully described the invention, it will be apparent to one of ordinary skill in the art that many changes and modifications can be made thereto without departing from the spirit or scope of the invention as set forth herein.

What is claimed is:

1. A bumper core of improved dimensional accuracy comprising:
 two core members of foamed polypropylene having confronting end portions tapered along the outer circumference thereof and bonded at said confronting end portions to form a unitary bumper core.

2. A bumper core as claimed in claim 1, wherein the core-constituting members have been bonded into the unitary body by the thermal melt-bonding technique.

3. A bumper core as claimed in claim 1, wherein the core-constituting members have been bonded into the unitary body with an adhesive.

4. A bumper core as claimed in claim 1, wherein the bumper core comprises two core-constituting members, which respectively have external configurations and dimensions conforming substantially with those of equal lengthwise two halves of the core, bonded together with their bonded end portions assuming substantially the lengthwise central part of the core.

5. A method of producing a bumper core of improved dimensional accuracy by combining two core members comprising the following steps:
 placing pre-foamed beads of a polypropylene based resin in an appropriate mold the inside thereof conforming with the outside dimension of said bumper core members;
 heating said resin to expand same;
 forming tapered ends on the circumference on the inner end of said bumper core members;
 confronting said members at their confronting tapered lengthwise end portions to form a bumper core of the required length by bonding the confronting ends to each other.

6. A process as claimed in claim 5, wherein core-constituting members having external configurations and dimensions conforming respectively with those of equal lengthwise two halves of the core are molded respectively, and the resulting core-constituting members are bonded together in such a way that their bonded end portions assume substantially the lengthwise central part of the core.

7. A process as claimed in claim 5, wherein the core-constituting members are thermally melt-bonded at their confronting lengthwise end portions.

8. A process as claimed in claim 7, wherein the core-constituting members are disposed with their end portions, which are to be bonded together, confronting each other; the core-constituting members are moved closer to each other; a heating blade is inserted between the mutually-confronting end portions of the core-constituting members so as to heat and melt the confronting end portions and is then withdrawn; and the thus-molten end portions are thereafter pressed against each other to bond the confronting end portions together.

9. A process as claimed in claim 5, wherein the core-constituting members are bonded together at their confronting lengthwise end portions with an adhesive.

10. A process as claimed in claim 5, wherein each of the core-constituting members is tapered along the outer circumference of the end portion thereof.

* * * * *